United States Patent
Furthmann et al.

(10) Patent No.: US 9,205,988 B2
(45) Date of Patent: Dec. 8, 2015

(54) BUCKET ELEVATOR WITH BELT PROTECTED BY THE BUCKET SECTION

(71) Applicant: AUMUND FOERDERTECHNIK GMBH, Rheinberg (DE)

(72) Inventors: Reiner Furthmann, Rheinberg (DE); Christian Kirschniok, Moers (DE)

(73) Assignee: AUMUND FORDERTECHNIK GMBH, Rheinberg (DE)

( * ) Notice: Subject to any disclaimer, the term of this patent is extended or adjusted under 35 U.S.C. 154(b) by 0 days.

(21) Appl. No.: 14/412,651

(22) PCT Filed: Jul. 1, 2013

(86) PCT No.: PCT/EP2013/063823
§ 371 (c)(1),
(2) Date: Jan. 2, 2015

(87) PCT Pub. No.: WO2014/005991
PCT Pub. Date: Jan. 9, 2014

(65) Prior Publication Data
US 2015/0144463 A1 May 28, 2015

(30) Foreign Application Priority Data
Jul. 4, 2012 (DE) .......... 10 2012 105 988

(51) Int. Cl.
*B65G 17/36* (2006.01)
*B65G 17/12* (2006.01)

(52) U.S. Cl.
CPC .......... *B65G 17/126* (2013.01); *B65G 2201/04* (2013.01)

(58) Field of Classification Search
CPC ...... B65G 17/126; B65G 17/36; B65G 17/42; B65G 2812/02247; B65G 15/30
USPC .......................... 198/708, 711, 713
See application file for complete search history.

(56) References Cited

U.S. PATENT DOCUMENTS

| | | | | |
|---|---|---|---|---|
| 2,510,212 A | * | 6/1950 | Donnell | 198/711 |
| 3,197,018 A | * | 7/1965 | Kayser | 198/711 |
| 3,247,951 A | | 4/1966 | Cochran | |
| 4,200,184 A | * | 4/1980 | Tripoteau | 198/713 |
| 4,333,561 A | | 6/1982 | Schlegel | |

(Continued)

FOREIGN PATENT DOCUMENTS

| | | |
|---|---|---|
| DE | 1120365 | 12/1961 |
| DE | 1199184 | 8/1965 |
| DE | 19750996 A1 | 5/1999 |

(Continued)

OTHER PUBLICATIONS

ISR, for PCT/EP2013/063823, dated Aug. 22, 2013.

*Primary Examiner* — James R Bidwell
(74) *Attorney, Agent, or Firm* — Jennifer S. Stachniak

(57) ABSTRACT

A belt bucket elevator for conveying bulk material includes a driven endless belt (23), which is circulated via drums arranged on a bucket elevator head and on a bucket elevator base, and at least one row of buckets (10), each of which is individually fixed to the belt (23) and has a base (15), a back wall (11), lateral walls (13), and a front wall (12). Each of the buckets (10) has a smaller width at the base (15) than at the upper ends of the lateral walls (13). The belt (23), including the outer lateral edges of the belt, is completely covered by the buckets (10) arranged thereon.

12 Claims, 5 Drawing Sheets

(56) References Cited

U.S. PATENT DOCUMENTS 5,143,203 A 9/1992 Hinner
6,220,425 B1 4/2001 Knapp

FOREIGN PATENT DOCUMENTS

EP 0186772 A1 9/1986
FR 544.244 9/1922

* cited by examiner

BUCKET ELEVATOR WITH BELT PROTECTED BY THE BUCKET SECTION

The instant application should be granted the priority dates of 4 Jul. 2012, the filing date of the corresponding German application DE 10 2012 105 988.8, as well as 1 Jul. 2013, the filing date of the international patent application. PCT/EP2013/063823.

BACKGROUND OF THE INVENTION

The invention relates to a belt bucket elevator for conveying bulk material with a driven endless belt, which is circulated via drums arranged on a bucket elevator head and on a bucket elevator base, and with at least one row of buckets, each of which is individually fixed to the belt and each of which has a base, a back wall, lateral walls, and a front wall.

A belt bucket elevator with the above features is known from DE 201 13 181 U1. With this belt bucket elevator, as well as with other belt bucket elevators known from the state of the art (see for example DE 200 15 552 U1), the individual buckets are attached at their back walls spaced from one another on the circulating belt, whereby the belt has a greater width than the buckets, in order, for example to make accessible at least one outer edge of the belt for an associated belt misalignment monitoring device.

These types of known belt bucket elevators, however, have the disadvantage that bulk material particles can penetrate between the belt and the back wall of the bucket when bulk material is supplied to the buckets in the area of the bucket elevator head and fall into the further opening intermediate spaces between the belt and the back wall of the bucket during circulation via the drums, and here, in particular, while the belt is circulating with the buckets attached thereto, can be jammed via the bucket elevator base or can be crushed by occurring forces, whereby damage to the belt and/or the bucket attachments can occur. In addition, high forces produced in this manner act on the attachment of the bucket to the belt. These risks increase in particular with increasing fragment size of the conveyed bulk material.

A belt bucket elevator with a row of buckets arranged on the belt in a close sequence is described in U.S. Pat. No. 4,333,561. Groups of buckets are formed, each with a lowermost bucket having a closed based and further buckets arranged in columns above it, each having an open base. The bases of the individual buckets, respectively, run above the upper edge of the respective lower bucket, so that spacing is provided between the individual bucket attachments. As a result, the bucket is narrower than the width of the belt, so that the outer edges of the belt are exposed.

A bucket elevator with buckets attached to lateral traction means and closely arranged to one another in succession is further known from DE 1 199 184 A. The individual buckets have bases curved in half-cylinder shapes, as well as, respectively, a resilient front wall that slides on the half-cylindrical base of a preceding bucket, such that the mutual overlapping of the bucket also is maintained during circulation via a drum.

SUMMARY OF THE INVENTION

The invention is based on the object of improving a belt bucket elevator with the above-described features and in particular, is directed to the conveyance of coarse grain.

The invention contemplates in its main concept that the buckets, which are arranged in close succession to one another in at least one row extending in a running direction of the belt, have a smaller width at their bases than at the upper end of their lateral walls which thus extend laterally outwards, and that the bucket arrangement is designed, such that the belt is covered completely, including its outer lateral edges, by the buckets arranged on it.

The present invention has the advantage that, based on the close sequencing of the individual buckets in the rows of buckets, penetration of bulk material particles in the space between the bucket and belt is prevented, so that the belt bucket elevator according to the present invention is particularly suited for conveyance of bulk materials having coarse particles. Since the buckets are arranged on the belt, if necessary, in multiple adjacent rows so that the belt is completely covered by the buckets disposed on it, the belt is protected on its surface by the bucket assembly and can be configured, if necessary, with a minimal safety margin and in a cost-saving manner depending on the conveyance capacity of a bucket line section. In addition, the outer edges of the belt are covered by the buckets, so that the outer edges likewise are protected.

In a first, simplest embodiment of the invention, it is provided that when only one row of buckets arranged on the belt is provided, the buckets have a greater width than the width of the belt and extend, respectively laterally over the lateral edges of the belt.

So that belt bucket elevators can be provided with a larger conveying capacity if desired, in which at least two or more rows of buckets are arranged adjacent in the running direction of the belt, according to an alternative embodiment of the invention, complete coverage of the belt by the buckets arranged thereon is ensured, in that by maintaining the close arrangement and the mutual overlapping of the buckets arranged in one row, the individual buckets of adjacent bucket rows are disposed with an offset to one another in the running direction of the belt, such that the upper ends of the laterally positioned side walls of the buckets overlap one another, respectively.

According to a further embodiment of the invention, it is provided that the buckets are attached to the belt in a mutual overlapping that is maintained during circulation via each of the drums.

According to a further embodiment of the invention, it is provided that on the lower ends of their back walls facing the belt, the buckets have an overhang over the base of the bucket in the direction of the successive bucket in the running direction, which, with buckets arranged perpendicular to one another, engage between the lateral walls of the bucket that projects over the upper edge of the back wall of the successive bucket in the running direction and extends sealingly, if necessary while maintaining a minimal spacing, to the upper edge of the back wall of the successive bucket. Since it is further proposed that the lateral walls of adjacent buckets overlap one another in the running direction, by means of this overlap, the existence of open holes or intermediate spaces also during circulation of the buckets via the drums is prevented, so that no bulk materials can move between the buckets and the belt supporting it.

Regarding a further advantageous embodiment of the bucket, it can be provided that the upper edge of the bucket's back wall running parallel to the belt has an inner curved region in the direction of the bucket opening.

According to a further exemplary embodiment of the invention, it is provided that for attachment of the individual buckets to the belt, a fastening plate is provided between the back wall of the bucket and the belt, so that the required clearance for the mutual overlapping of the individual buckets attached to the belt is provided.

In the frame of this type of design, for providing an overlapping of the buckets, it is provided that the overhang that projects over the base of the bucket of the preceding bucket in the running direction, with buckets that are arranged perpendicularly over one another, engages between the curved region of the back wall and the belt supporting the bucket, so that an overlapping of the overhang of the preceding bucket with the back wall of the successive bucket is provided.

For improving the overlapping of the individual buckets, according to an exemplary embodiment of the invention, it is provided that the inwardly curved region of the back wall continues into an outwardly bent extension with a hook opening formed thereby in a rearward region and the projection that overhangs the base of the preceding bucket in the running direction is formed in a hook shape with a hook engaging in the hook opening of the successive bucket. In this connection, the advantage is provided that the engagement of the hook of the preceding bucket with the hook opening of the successive bucket is retained also during circulation of the belt carrying the buckets via a bend drum.

The desired overlapping is further improved according to a further exemplary embodiment of the invention, in which the lateral walls of the bucket have a triangular shape at their upper ends, whose tip is positioned above the end of the bent region of the back wall.

For reinforcement of the bucket, it can be provided that the upper edge of the back wall of the bucket is provided with an interior reinforcement profile and/or that in the interior of the bucket, a reinforcement angle is mounted in the interior of the bucket in the joint area of the base and back wall.

BRIEF DESCRIPTION OF THE DRAWINGS

In the drawings, exemplary embodiments of the invention are provided, which will be described below. In the drawings.

DETAILED DESCRIPTION OF SPECIFIC EMBODIMENTS

Figure 1:
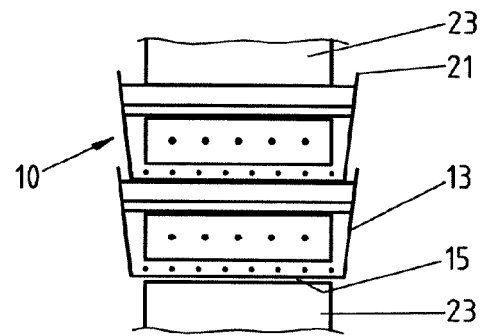
FIG. 1 shows a belt with a row of buckets arranged thereon in a schematic front view.

With the embodiment shown in FIG. 1, a row of buckets overlapping one another is arranged on a belt 23 in a close sequence. As can be seen from FIG. 2, each bucket 10 comprises a back wall 11 which serves as an attachment device of the bucket 10 to a belt, a front wall 12 disposed opposite thereto, whereby the back wall 11 and the front wall 12 are connected by lateral walls 13 with one another, so that a bucket opening 14 for receipt of the bulk material to be conveyed is provided. The bucket is closed by a base 15. The bucket 10 is attached to a belt 23 of a belt bucket elevator, whereby for attachment, a fastening plate 30, through which attachment means engage, is arranged between the back wall 11 of the bucket 10 and the belt 23, which provides the necessary space for the overlapping of the individual buckets with one another, as explained below.

For achieving the overlapping of the buckets 10 following one another in the running direction provided by the present invention, each bucket 15 has on the lower end of the back wall 11 an overhang 16 that projects over the base 15 of the bucket. With the represented embodiment, the upper edge 17 of the bucket 10 bends in the direction of the bucket opening 14 from the back wall 11 inwardly and has a corresponding bent region 24. At the end of the bent region 24, a reinforcement profile 18 is mounted for reinforcement of the upper edge 17 of the bucket. Further, in the interior of the bucket opening 14 in the joint area of the base 15 and the back wall 11, a reinforcement angle 19 is provided. Further, in the back wall 11, recesses 20 are formed for receiving attachment means, preferably plate screws, for attachment of the bucket to a belt.

Figure 2:
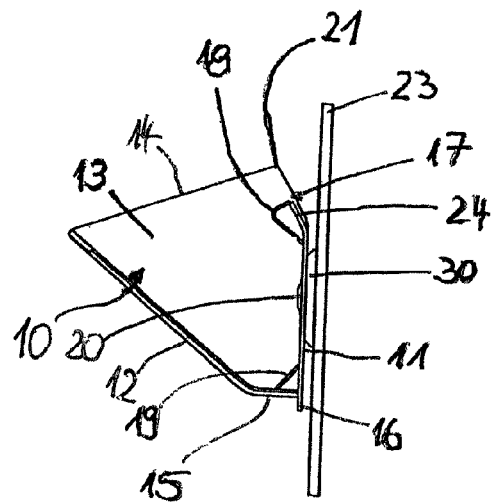
FIG. 2 shows an individual bucket attached to the belt in a schematic side view.

As further shown in FIG. 2, the lateral walls 13 projecting over the upper edge 17 have on their upper ends, respectively, a triangular contour with a tip 21, which is positioned approximately above the end of the bent region 24 of the back wall 11.

Figure 3:
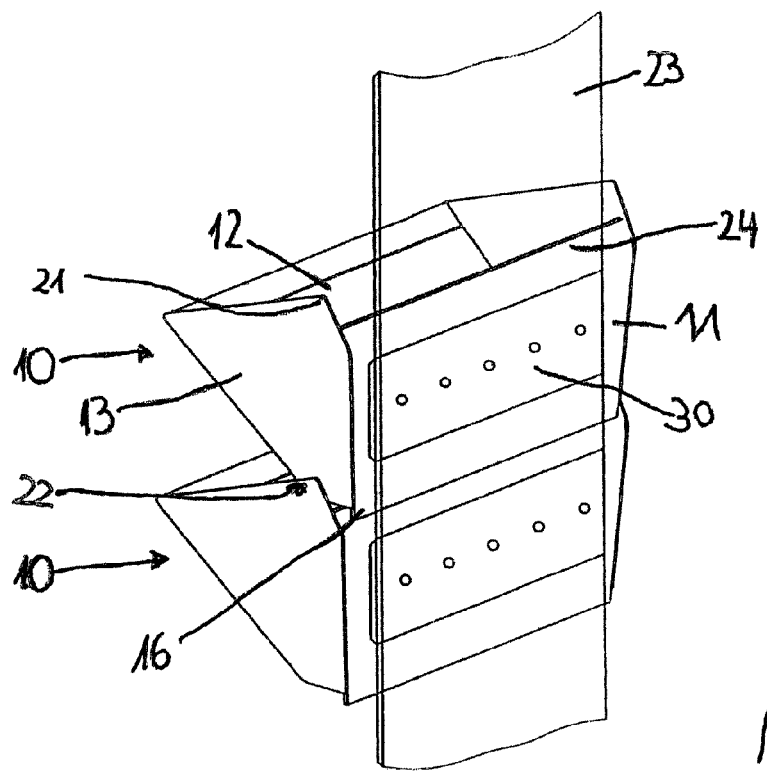
FIG. 3 shows two successive buckets in the running direction in a rearward perspective view.

The technical background, in particular, the embodiment of the upper end of the lateral walls 13, as well as the back walls 11 with respective overhang 16 of the bucket 10 is provided in FIG. 3, from which it is evident that, in a position lying perpendicularly over one another, the lateral walls 13 of adjacent buckets 10, based on their triangular shape and the overlap projecting over the upper edge 17 of the back wall 10 overlap one another with an overlapping region 22. In this manner, the overhangs 16 projecting over the respective base 15 of a bucket engage between the overhanging side walls 13 of the successive bucket 10 in the running direction and extend to an overlapping with the curved or bent region 24 of the back wall 11 of the successive bucket 10, whereby each overhang 16 is held by a fastening plate 30 in a spaced relationship to the belt 23.

Figure 4:
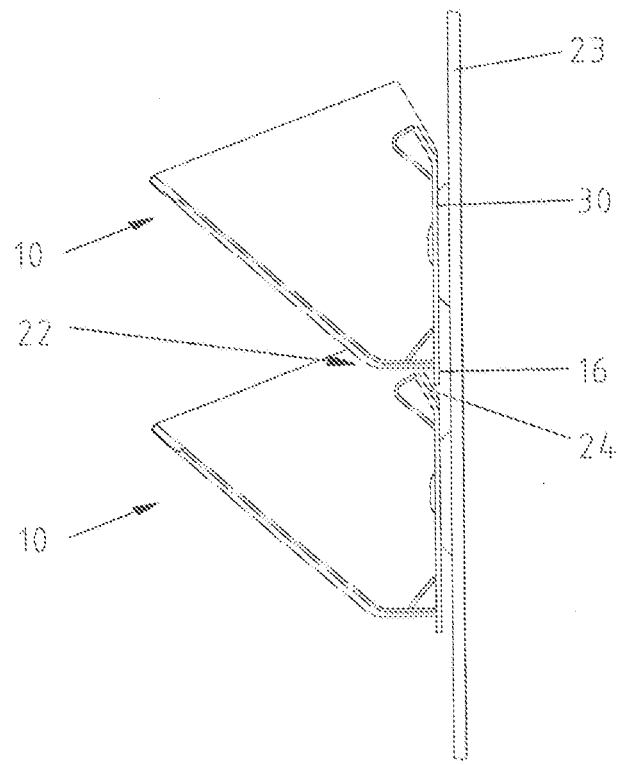
FIG. 4 shows both buckets of FIG. 3 attached to a belt in a side view corresponding to FIG. 2.
Figure 5:
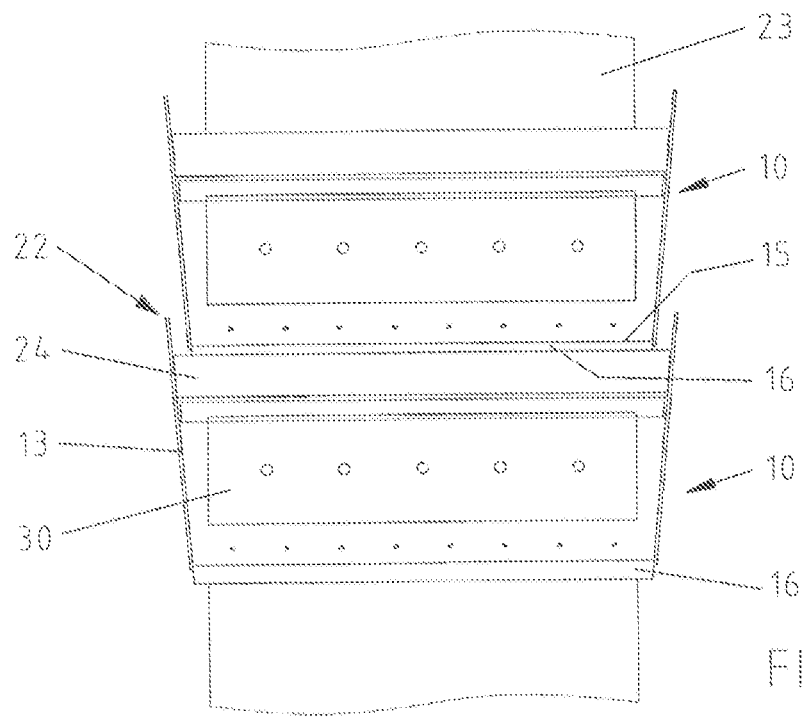
FIG. 5 shows the subject matter of FIG. 4 in a front view.
Figure 6:
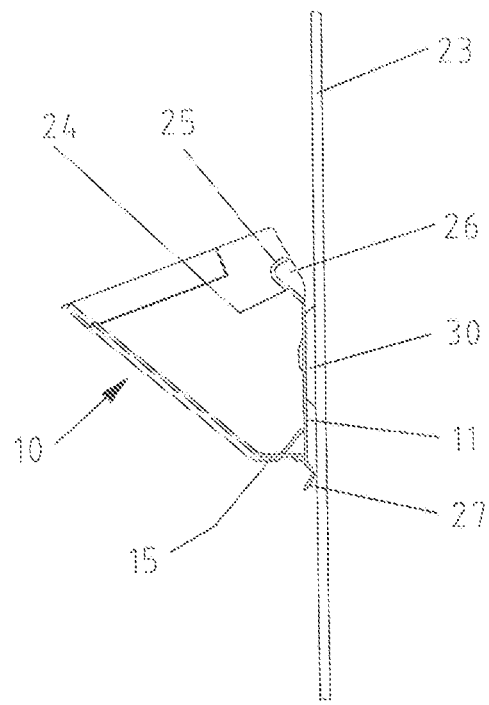
FIG. 6 shows another exemplary embodiment of an individual bucket in a representation according to FIG. 2.
Figure 7:
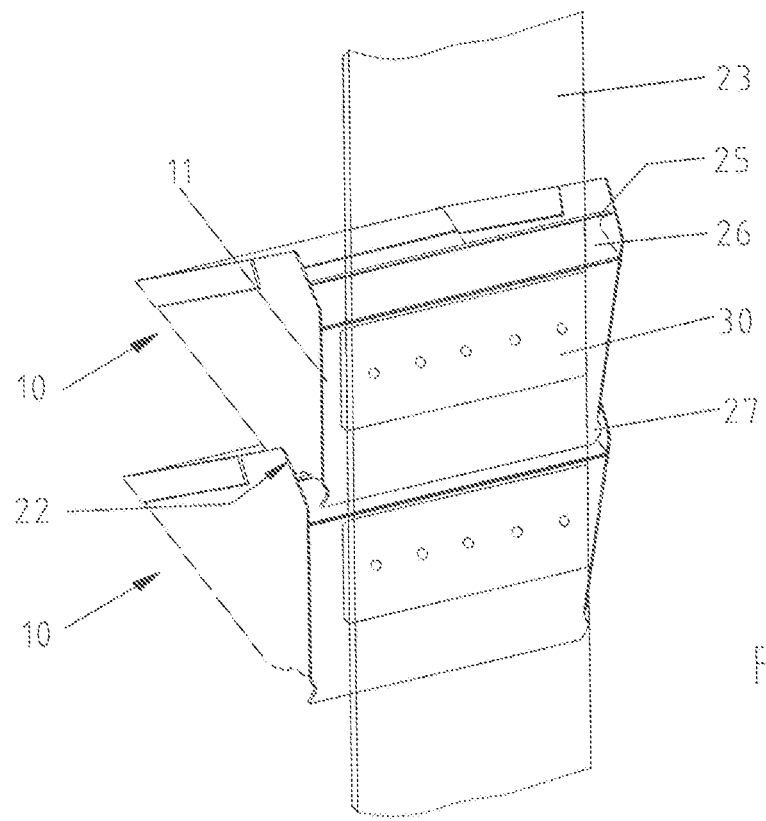
FIG. 7 shows two successive buckets in the running direction according to FIG. 6 in a rearward perspective.
Figure 8:
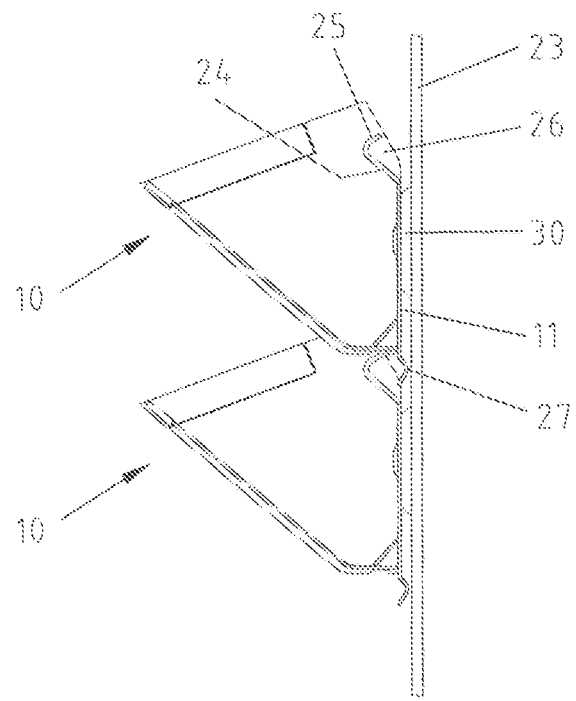
FIG. 8 shows both buckets according to FIG. 7 in a side view according to FIG. 6.
Figure 9:
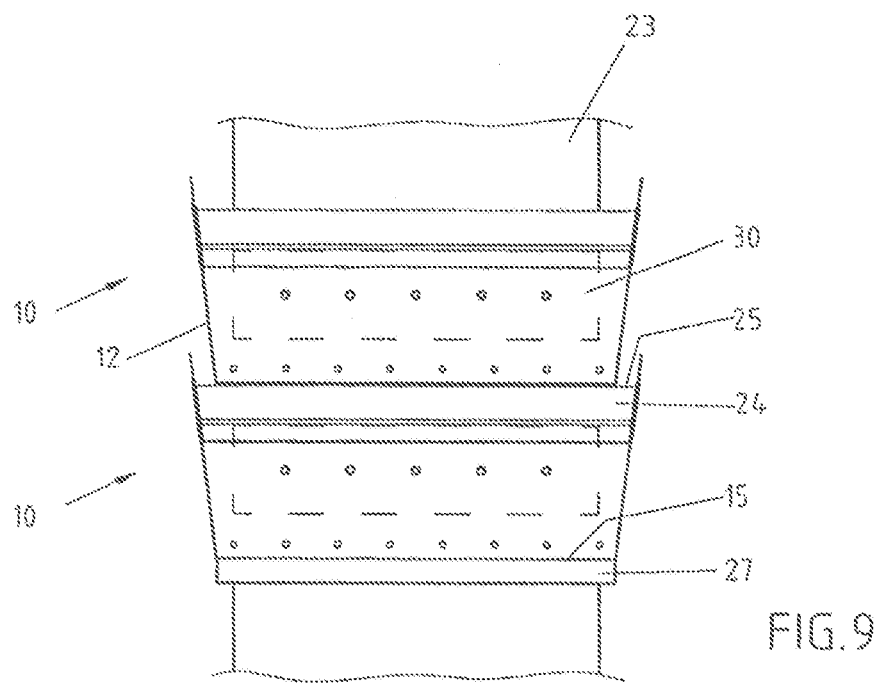
FIG. 9 shows the subject matter of FIG. 8 in a front view.

FIGS. 4 and 5 show the association of a bucket line formed from multiple buckets 10 with a belt 23 carrying the buckets, whereby on the one hand, it is clear that the width of the buckets 10 is greater than the width of the belt 23 and on the other hand, the overhangs 16 formed on the base 15 of each bucket 10 engage in the intermediate space formed by the arrangement of the fastening plate 30, respectively, between the bent region 24 of a bucket 10 and the belt running along the back wall 11, so that the overlapping in this regard of the individual bucket 10 attached to the belt 23 also is retained during circulation of the belt 23 with the buckets 10 via drums arranged at the bucket elevator head and the bucket elevator base, respectively.

The exemplary embodiment shown in FIGS. 6 through 10 differs from the previously described embodiment by a different design of the upper, inwardly bent region 24 of the back wall 11 on the one hand, and of the overhang 16 projecting over the base 15 of the bucket 10 on the other hand. Both above-noted parts are formed and coordinate to one another, such that the mutual overlapping of the bucket 10 by a form-locking engagement of the respective components is ensured.

In detail, it is provided that the inwardly bent region 24 of the back wall 11 continues, in turn, in an outwardly bent hook-shaped projection 25, whereby beneath the projection 25 and in its rearward region, a hook opening 26 that opens to the belt 23 is provided. The overhang 16 of the bucket 10 projecting over the base 15 of the bucket 10 is likewise formed with a hook-shaped design, whereby a hook 27 locks into the hook opening 26 of the respective successive bucket 10. Since the design of the hook shape of the overhang 16 extends easily over the vertical course of the back wall 11, the fastening plate 30 arranged between the back wall 11 and the belt 23 determines the necessary free space.

Figure 10:
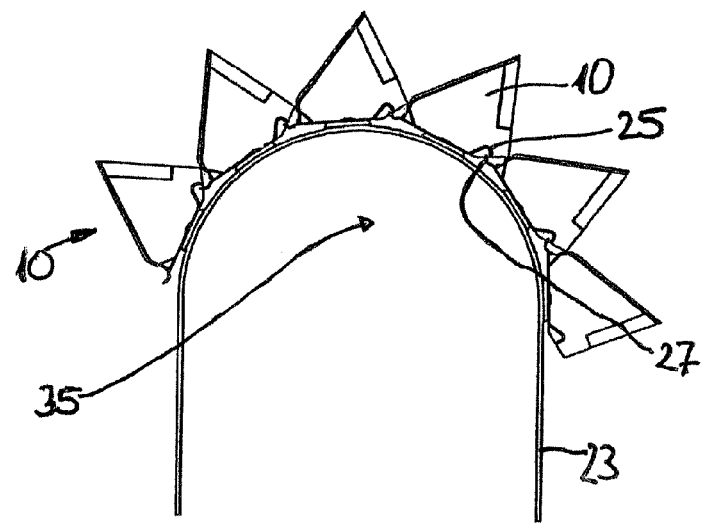
FIG. 10 shows a sequence of buckets secured to a belt during circulation of the belt via a drum arranged on the bucket elevator head in a schematic side view.

As provided in FIG. 10, the form-locking engagement of hooks 27 into the hook openings 26 is retained also during circulation of the belt 23 via drum 35, arranged for example on a bucket elevator head, and also, when during this circulation, the position of the individual buckets 10 change relative to one another.

Figure 11:
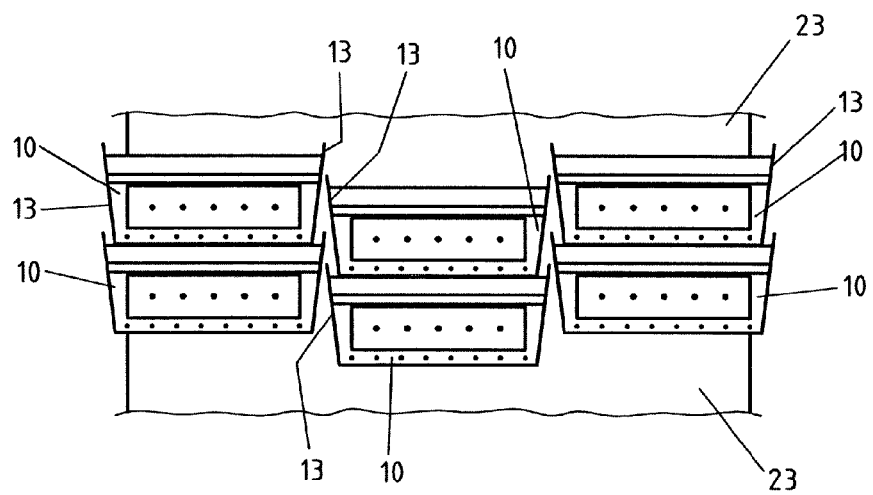
FIG. 11 shows a belt with three rows of buckets arranged next to one another in a schematic front view.

According to the embodiment shown in FIG. 11, three rows of buckets 10 are arranged in the running direction adjacent one another, such that each row of buckets 20 are arranged or formed as previously described with reference to FIGS. 1 through 10. So the surface of the belt 23 also is covered completely with multiple rows of buckets 10, the individual rows of buckets 10 are arranged respectively with a defined offset to one another in the running direction of the belt, such that the upper ends of the lateral walls 13 of the bucket 10 positioned laterally outward respectively overlap one another. At the same time, the arrangement is set up such that the buckets overhang the respective external bucket rows with their lateral walls 13 over the lateral edges of the belt 23, as described with regard to each individual bucket row, so that the outer lateral edges of the belt 23 are protected by the bucket arrangement.

The features of the subject matter of this specification disclosed in the foregoing description, the patent claims, the abstract and the drawings can be essential individually as well as in any combination for realizing the invention in its various forms.

The specification incorporates by reference the disclosure of German patent application DE 10 2012 105 988.8, filed 4 Jul. 2012 as well as international application PCT/EP2013/063823, filed 1 Jul. 2013.

The present invention is, of course, in no way restricted to the specific disclosure of the specification and drawings, but also encompasses any modifications within the scope of the appended claims.

The invention claimed is:

1. A belt bucket elevator for conveying bulk material, comprising:
 a driven endless belt (23), which is circulated via drums arranged on a bucket elevator head and on a bucket elevator base;
 at least one row of buckets (10), where each of the buckets is individually fixed to the belt (23) and has a base (15), a back wall (11), lateral walls (13), and a front wall (12), said row extending in the running direction of the belt (23), wherein each of the buckets (10), which are arranged in close succession relative to one another in at least one row extending in the running direction of the belt (23) has a smaller width at the base (15) than at upper ends of the lateral walls (13), wherein said upper ends of the lateral walls extend outwards laterally, and wherein the buckets are arranged on the belt (23) such that the belt (23), including the outer lateral edges of the belt, is completely covered by the buckets (10) arranged thereon,
 wherein each of the buckets (10) has an overhang (16) on lower ends of the back wall (11) facing the belt (23), wherein the overhang extends over the base (15) of the bucket (10) in a direction of the successive bucket (10) in the running direction, wherein, with buckets arranged perpendicularly on top of one another, the overhang engages between the lateral walls (13) that project over the upper edge (17) of the back wall (11) of the successive bucket in the running direction and extends sealingly to the upper edge (17) of the back wall (11) of the successive bucket (10).

2. The belt bucket elevator according to claim 1, wherein when only one row of buckets (10) is arranged on the belt (23), the buckets (10) have a greater width than the width of the belt (23) and extend, respectively, laterally over the lateral edges of the belt (23).

3. The belt bucket elevator according to claim 1, wherein when multiple rows of buckets (10) are arranged adjacently in the running direction of the belt (23), the individual buckets (10) of adjacent bucket rows are arranged relative to one another with an offset oriented in the running direction of the belt (23), such that the upper ends of the lateral walls (13) of the buckets (13), respectively, overlap one another.

4. The belt bucket elevator according to claim 1, wherein the buckets (10) are attached to the belt (23) in a sustained, mutual overlapping also during circulation via each of the drums.

5. The belt bucket elevator according to claim 1, wherein the lateral walls (13) of adjacent buckets (10) overlap one another in the running direction.

6. The belt bucket elevator according to claim 1, wherein the back wall (11) of the bucket (10) running parallel to the belt (23) has a region (24) bent inwardly from the back wall (11) in the direction of a bucket opening (14) at its upper edge facing away from the base (15).

7. The belt bucket elevator according to claim 1, wherein a fastening plate (30) is arranged between the back wall (11) of the bucket (10) and the belt (23) for attachment of the individual buckets (10) to the belt (23).

8. The belt bucket elevator according to claim 1, wherein the overhang (16) of the preceding bucket (10) in the conveying direction that projects over the base (15) of the bucket (10), with buckets disposed perpendicularly on top of one another, engages between the bent region (24) of the back wall (11) and the belt (23) carrying the buckets (10).

9. The belt bucket elevator according to claim 6, wherein the inwardly bent region (24) of the back wall (11) continues in turn to a outwardly bent, hook-shaped projection (25) with a hook opening (26) formed thereby in a rearward region and the overhang (16) projecting over the base (15) of the bucket (10) of the preceding bucket (10) in the conveying direction has a hook-shape with a hook (27) engaging in the hook opening (26) of the successive bucket (10).

10. The belt bucket elevator according to claim 1, wherein the lateral walls (13) of the bucket (10) have a respective triangular contour on their upper ends, wherein said triangular contour has a tip (21) that is positioned above the end of the bent region (24) of the back wall (11).

11. The belt bucket elevator according to claim 1, wherein the upper edge (17) of the back wall (11) of the bucket (10) is provided with an internal reinforcement profile (18).

12. The belt bucket elevator according to claim 1, wherein a reinforcement angle (19) is provided in the interior of the bucket (10), in a joint area of the base (15) and back wall (11).

* * * * *